July 25, 1967  EIJI SUZUKI  3,332,294
OPERATING MECHANISM FOR AN ALTERNATE PULLING TYPE CONTROL
TRANSMISSION DEVICE EMPLOYING A PAIR OF FLEXIBLE WIRES
Filed Feb. 9, 1965  2 Sheets-Sheet 1
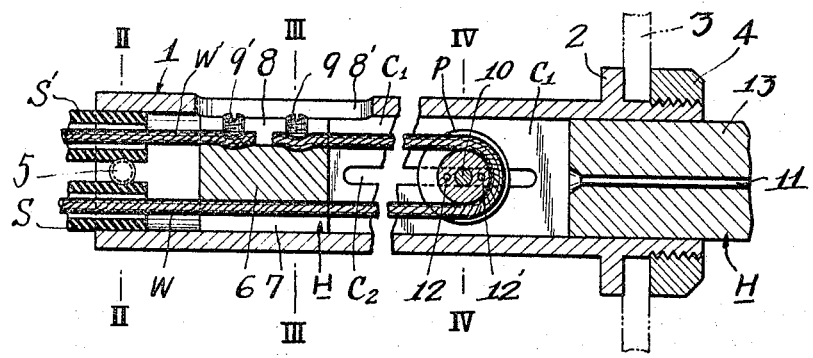
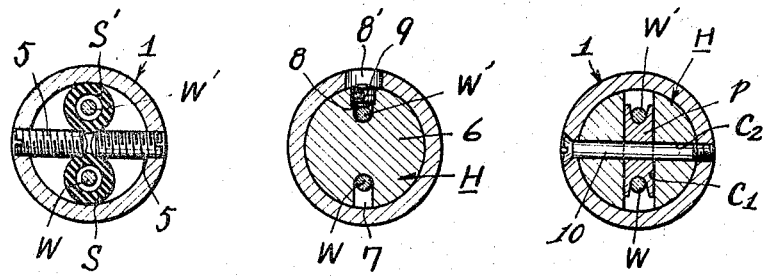
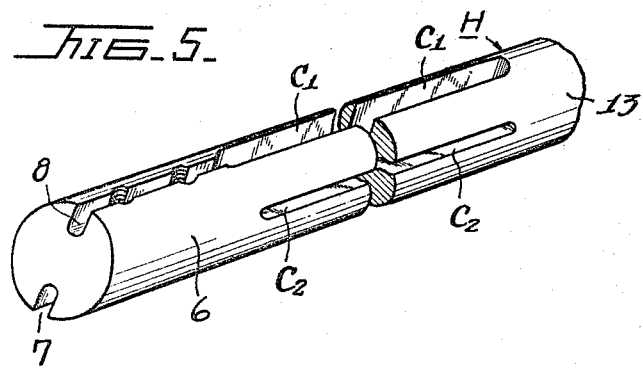
INVENTOR.
*Eiji Suzuki*
BY

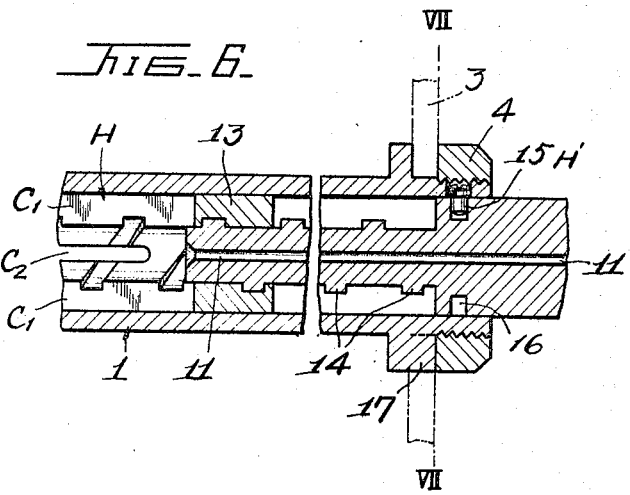

United States Patent Office 3,332,294
Patented July 25, 1967

3,332,294
OPERATING MECHANISM FOR AN ALTERNATE PULLING TYPE CONTROL TRANSMISSION DEVICE EMPLOYING A PAIR OF FLEXIBLE WIRES
Eiji Suzuki, 11 22-ban, Kamiyama-cho, Shibuya-ku, Tokyo, Japan
Filed Feb. 9, 1965, Ser. No. 431,373
Claims priority, application Japan, Feb. 12, 1964, 39/7,122
7 Claims. (Cl. 74—89.22)

The present invention relates to an operating mechanism for an alternate pulling type control transmission device in which a pair of flexible wires are disposed in parallel to each other in a sheath for simultaneous movement in opposite directions.

The prior art control transmission devices which employ sets of flexible wires movably disposed in sheaths have characteristics and advantages such as applicability to non-linear transmission paths and protection from dust or any other environments which can not be attained by the use of any other types of control transmission devices. However, in such prior art control transmission devices employing sets of flexible wires, there is inevitably the disadvantage that the transmission force in the pushing direction is less than that in the pulling direction because of the general characteristics of wires. In order to provide a control transmission device employing sets of flexible wires which retains the above characteristics and advantages while eliminating such a disadvantage, a pair or pairs of wires are usually disposed in the sheath for simultaneous movement in opposite directions. However, according to this system, when a balance lever to which one pair of ends of the pair or pairs of wires are secured at the two sides of its fulcrum, is employed as the operating mechanism at the input and output ends, or when a pulley on which one pair of ends of the pair or pairs of wires are wound in opposite directions and to which said wires are secured, is employed as the operating mechanism, there will be inherent disadvantages such as increase in space necessary around the transmission lines near the input and output ends, restriction in a maximum transmission stroke due to increase in the diameter of the pulley and in the number of windings of the wires on the pulley, and increase in bending frequency in the movement of the wires.

One object of the present invention is to provide an improved operating mechanism for an alternate pulling type control transmission device which can eliminate the disadvantages inherent to the prior art alternate pulling type control transmission devices.

Another object of the present invention is to provide a novel operating mechanism for an alternate pulling type control transmission device having compactness in design and reliability for operation in either direction.

A further object of the present invention is to provide a novel operating mechanism for an alternate pulling type control transmission device having a simple construction adapted to be manufactured on a mass production scale thereby to reduce the production cost of such a mechanism and make it easier to assemble, disjoint and adjust the mechanism.

According to the present invention, there is provide an operating mechanism for an alternate pulling type control transmission device, which comprises a cylindrical casing, a pair of sheaths on which the casing is mounted for slidable movement, a grooved pulley near the outer end of the casing supported within the casing for rotational movement, and a pair of flexible wires which extend beyond the corresponding ends of the respective sheaths and one of which is trained over an operating pulley.

The ends of the sheaths beyond which the wire ends extend are adjustably disposed within the casing and the sheaths are reciprocally movable within the casing and detachably secured by any suitable means to the casing. The extension of only one of each pair of wires is trained over the grooved pulley and the extreme end of the extension is detachably secured by means of a set screw to the inner end of the operating member, and similarly, the extension of the other wire of each pair of wires is detachably secured by means of a set screw to the inner end of the operating member. The pulley is supported in the intermediate portion of the operating member within the casing. At least the inner end portion of the operating member is disposed for reciprocal movement (in its control-transmission stroke) between the ends of the sheaths and the pulley within the casing. The operating member is provided with two substantially parallel notches or grooves for receiving the respective wires at its inner end, and as already mentioned the ends of the wire extensions which extend beyond the respective sheath ends are detachably secured to the operating member.

The above and other objects and advantages of the present invention will be more readily apparent from the following description when read in connection with the accompanying drawings.

In several drawings, the identical or equivalent parts are assigned the same numeral references thereto with addition of primes.

In the drawings:

FIG. 1 is a longitudinally sectional view of a portion of a control transmission device incorporating a preferred form of operating mechanism according to the present invention and which is taken along a plane including a pair of wires;

FIG. 2 is a cross-sectional view taken along the line II—II of FIG. 1;

FIG. 3 is a cross-sectional view taken along the line III—III of FIG. 1;

FIG. 4 is a cross-sectional view taken along the line IV—IV of FIG. 1;

FIG. 5 is a perspective view of a portion of a reciprocally movable operating member;

FIG. 6 is a longitudinally sectional view of a portion of a control transmission device in which a rotary operating member is coaxially disposed within the reciprocal operating member;

FIG. 7 is a cross-sectional view taken along the line VII—VII of FIG. 6; and

FIG. 8 is similar to FIG. 4 but is a cross-sectional view of a modified casing and pulley shaft respectively.

Reference will be now had on the drawings and in which an operating mechanism for an alternate pulling type control transmission device is shown as comprising a cylindrical casing 1 into which the inner end portions of a pair of sheaths S and S' extend. A reciprocal operating member H is disposed within the casing 1 for reciprocal movement therein and the operating member is provided with a vertical slit $C_1$ extending along a substantial portion of the length of the operating member and a transverse slit $C_2$ extending in a distance shorter than the vertical slit $C_1$ along the length of the operating member. These vertical and transverse slits $C_1$ and $C_2$ intersect at right angles to each other. A grooved pulley P is disposed within the vertical slit $C_1$ and the pulley is supported by a pulley shaft 10 which extends through the transverse slit $C_2$ and is secured to the casing. A wire W extends beyond the inner end of one sheath S and the extension of the wire passes through a lower groove 7 formed in the inner end of the operating member H and is trained over the grooved pulley P, and the extreme end of the wire extension is secured by means of a set crew 9 in a second or upper groove 8 formed in the inner end of the operating member H. Another wire W' extends beyond the inner end of the other sheath S' and the extreme end of the wire extension W' is similarly secured by means of a set screw 9' in the second groove 8 of the inner end 6 of the operating member H. Alternatively, the pair of wires may be replaced by a single continuous wire and in this case only one set screw may be employed for securing the wire to the operating member. In preparation for assembling the operating mechanism, a length of temporary wire (not shown) is trained over the pulley in the direction opposite to the directon in which the wire extension W is trained or the temporary wire is passed through one of two holes 12 and 12' formed in the pulley P. In either cases, both ends of the temporary wire are guided through the vertical slit $C_1$ into a guide groove 11 formed in an outer end portion 13 of the reciprocal operating member H (if the operating member H is formed by hollow tube, the hollow interior of the tube is utilized in place of the guide groove 11).

Thereafter, the operating member H and the pair of sheaths S and S' are loosely disposed within the casing 1 and the temporary wire is pulled with respect to the sheaths while moving the casing until the center bore of the pulley P comes to register with the pulley support bore of the casing 1. Then, the pulley shaft 10 is inserted into the registered bores of the pulley and casing by means of the transverse slit $C_2$ as shown in FIG. 4. Finally, the temporary wire is taken out of the guide groove 11 formed in the outer end 13 of the operating member H and the casing 1 is moved with respect to the sheaths S and S' to a proper position and in this position the sheaths are secured by means of a set screw 5 provided at the rear end of the casing thereto. As an example for positioning the casing 1, the casing 1 is provided near its outer end with a flange 2 and the flange is abutted against the rear surface of a mounting panel 3. The outer end of the casing secured by means of a set screw 5 provide at the rear end 1 is further provided with a thread portion on which a nut 4 is adapted to engage and the nut secures the casing 1 to the panel 3 in cooperation with the flange 2 (see FIG. 1).

When the position of the casing 1 is desired to be adjusted due to slackening in wire or wires, for example, one of the following steps or combination thereof is taken.

(1) The set screw 5 is loosened and the casing 1 is moved with respect to the sheaths S and S' to a new proper position and the set screw secures the casing in the adjusted position.

(2) The set screw 5 is loosened and the pulley P is removed from the operating member. Then, the casing 1 is moved until at least the grooves 7 and 8 are exposed (or a suitable window 8' is formed in the casing 1 in parallel to the groove 8 and if necessary, a rotary window cover (not shown) is provided in the window, and therefore, the removal of the pulley shaft 10 and the employment of the temporary wire can be eliminated), and the wire or wires are reset and secured by the set screw or screws 9 and/or 9' to the operating member.

In the operation, when the operating member H is moved in either forward or backward direction along the length of the casing 1, either the wire W or W' is pulled thereby, and in other words when one wire is advanced and the other wire is simultaneously retreated by a distance corresponding to the advanced distance of the former thereby to effect a positively controlled transmission.

Although not shown, the operating member H may be modified in such a way that the portions except the inner end portion 6, that is, the intermediate portion in which the intersecting slits $C_1$ and $C_2$ are formed and the outer end portion 13 are eliminated, and the window 8' is formed as having a length at least corresponding to the control transmission stroke of the operating member and a suitable hand operating means is provided extending from the inner end 6 of the operating member H through the window 8' to the outer surface of the casing 1 or alternatively an operating button is employed or the set screws 9 and 9' are employed as operating means by extending and enlarging the heads of the screws. Such a modification is also within the scope of the present invention.

FIG. 6 shows a modified embodiment of the present invention and in which an inner rotary operating member H' is coaxially disposed within the reciprocal operating member H and the rotary operating member H' is threaded into the outer end portion 13 and intermediate portion of the outer reciprocal operating member H at 14 (the thread pitch and shape may be suitably selected in accordance with the purpose for which the device is employed). The inner rotary operating member H' is prevented from longitudinal direction movement with respect to the casing 1. In this figure, numeral 15 is a pin whose fore end is inserted into an annular groove 16 formed in the rotary operating member H' and the pin 15 is threaded into the casing 1 near the outer end of the casing. The other construction, assembling, disjointing and adjustment manners of the modified device is substantially the same as those explained in connection with the preceding figures (only difference is that a projection 17 is provided in the flange 2 and the projection engages in the corresponding recess formed in the panel 3 for preventing the casing 1 from rotational movement).

In the operation of this modified embodiment, since the threads 14 are rotationally moved due to the rotational movement of the rotary operating member H', the reciprocal operating member H moves along the longitudinal directions of the casing 1 as in the case of the foregoing embodiment.

Although not shown, the mounting parts of the casing 1 such as the flange 2, panel 3 and nut 4 may be provided at the inner end of the casing (the left side of FIG. 6) instead of the outer end, and the rotary operating grip is rotatably disposed around the outer peripheral surface of the casing and the two rotary operating members are connected to each other at their outer end portions (in this case, it is, of course, necessary that the rotary operating grip is provided with a window for assembling the pin 15 or any suitable means which function as the pin and annular bore in combination are provided between the rotary operating grip and the outer periphery of the casing or the panel).

FIG. 8 shows a modified form of casing 1 in which the casing is formed by two members having a substantially half-round cross-section respectively. As shown in this figure, the casing 1 comprises casing members 1' and 1", and tubular shafts 18 and 18' each of which is integrally formed with each one of the casing members. A common bolt 19 extends through the two tubular shafts 18 and 18' and nuts 20 are threaded on the threaded end of the bolt 19 for connecting the casing members together. The assembling, disjointing, adjusting and operation of the operating mechanism incorporating this modified casing will be easily understood from the explanation in connection with the preceding embodiments, and further explanation will be not necessary here.

Although not shown, the casing members 1' and 1" may be connected together by the bolt 19, which act as means for assembling, and a pulley shaft when the tubular shafts 18 and 18' are not employed.

In any of the foregoing embodiments, a pair of wires are employed and the casing is in the form of a cylinder, but the present invention is not limited to such construction. For example, plural pairs of wires may be employed (in this case, one pulley is provided for each pair of wires or a single pulley having grooves whose number corresponds to the number of the wire pairs may be employed). The casing may be in the form of any other shape, for example, a cylinder having an angular cross-section.

Although not shown, the reciprocal operating member may be directly actuated by a suitable hand actuating means (for example, a button) without the provision of the rotary operating member or a suitable conventional mechanism may be provided either at the input end or the output end. Such an arrangement is also within the scope of the present invention.

And the relative movement direction or relative movement ratio between the input end and output end may be determined depending upon the position of the reciprocal operating member with respect to the pair of wires or the hand and pitch of the thread in the rotary operating member.

The present invention is effective to achieve the objects as set forth in the preamble, and this invention is especially applicable to remote control of various devices whose design becomes more complicated and compact in recent years.

While several embodiments of the invention have been shown and described in detail it will be understood that they are for the purpose of illustration only and are not to be taken as a definition of the scope of the invention, reference being had for this purpose to the appended claims.

What is claimed is:

1. An operating mechanism for an alternate pulling type control transmission device comprising
   a cyclindrical casing,
   a pair of sheaths adjustably fixed in a first and inner end of the cylindrical casing,
   an elongated operating member axially slidable within the casing and positioned at least partially within the other or outer end of said casing,
   a pulley rotatably supported on an axle attached to said casing adjacent the outer end thereof,
   said operating member having a pair of longitudinal internal slits extending therethrough and intersecting at right angles to each other adapted to permit said member to slide with respect to the pulley and its axle, the forward end of said operating member extending beyond said pulley and the inner end of said operating member extending to the rear of said pulley,
   said operating member including a pair of grooves leading from the inner end thereof adjacent the ends of the respective sheaths to said longitudinal slits,
   at least one flexible wire extending through a first of said sheaths, through the corresponding groove of the inner end of said operating member and partially around said pulley, and
   means for attaching said wire to said inner end of the operating member adjacent one of said grooves.

2. The device as claimed in claim 1, wherein the outer end of said operating member is substantially solid except for a longitudinal guide groove extending from the end of one of said longitudinal slits to the outside whereby a temporary wire can be guided therethrough to assemble the device.

3. The device as claimed in claim 1, wherein said casing has a longitudinal window above the inner end of said operating member, the length of said window corresponding in length to the length of stroke of the operating member, whereby the operating member may be manipulated through said window.

4. The device as claimed in claim 1 wherein the casing comprises a pair of longitudinal slots for receiving the axle of said pulley whereby the position of the pulley on the casing can be adjusted.

5. The device as claimed in claim 1 comprising set screw means for said casing adapted to adjustably fix the position of the sheaths within said casing.

6. The device as claimed in claim 1, said casing being formed of a pair of semi-cylindrical bodies, each of said bodies having a pair of matching tubular shafts adapted to form the axle for said pulley.

7. The device as claimed in claim 1, said casing comprising a flange at one end and a threaded portion adjacent the flange, and a nut for attaching the casing to a panel.

References Cited
UNITED STATES PATENTS

| | | | |
|---|---|---|---|
| 336,610 | 2/1886 | Weber | 160—345 |
| 1,509,740 | 9/1924 | Warsing | 160—345 |
| 1,823,909 | 9/1931 | Meier | 160—345 X |
| 1,845,949 | 2/1932 | Wittemann | 160—345 |
| 2,914,955 | 12/1959 | Colborne et al. | 74—89.22 X |

FRED C. MATTERN, Jr., *Primary Examiner.*

F. E. BAKER, C. J. HUSAR, *Assistant Examiners.*